United States Patent
Inoue et al.

(10) Patent No.: US 7,752,843 B2
(45) Date of Patent: Jul. 13, 2010

(54) HYDRAULIC FLUID RESERVOIR AND HYDRAULIC PRESSURE CONTROL UNIT

(75) Inventors: Isao Inoue, Yokohama (JP); Kensyo Tsushima, Yokohama (JP)

(73) Assignee: Bosch Corporation, Tokyo (JP)

( * ) Notice: Subject to any disclaimer, the term of this patent is extended or adjusted under 35 U.S.C. 154(b) by 539 days.

(21) Appl. No.: 11/718,938

(22) PCT Filed: Nov. 26, 2005

(86) PCT No.: PCT/JP2005/021740
§ 371 (c)(1), (2), (4) Date: May 9, 2007

(87) PCT Pub. No.: WO2006/057371
PCT Pub. Date: Jun. 1, 2006

(65) Prior Publication Data
US 2008/0092537 A1  Apr. 24, 2008

(30) Foreign Application Priority Data
Nov. 29, 2004 (JP) ............................. 2004-344813

(51) Int. Cl.
*F15B 7/10* (2006.01)
(52) U.S. Cl. ...................................................... 60/585
(58) Field of Classification Search .................. 60/413, 60/585
See application file for complete search history.

(56) References Cited

U.S. PATENT DOCUMENTS

| 4,703,979 | A | 11/1987 | Nakanishi et al. |
| 5,716,111 | A | 2/1998 | Schenk et al. |
| 6,302,498 | B1 | 10/2001 | Ariki et al. |
| 2004/0251441 | A1 | 12/2004 | Schmitt et al. |

FOREIGN PATENT DOCUMENTS

| DE | 43 34 941 A1 | 4/1994 |
| JP | 60206760 A | 10/1985 |
| JP | 6-127360 | 5/1994 |
| WO | WO0210110 A1 | 2/2002 |

OTHER PUBLICATIONS

CD-ROM of the specification and drawings annexed to the request of Japanese Utility Model Application No. 73130/1992 (laid-open No. 37036/1994), Unisia Jecs Corporation, May 17, 1994.

*Primary Examiner*—Michael Leslie
(74) *Attorney, Agent, or Firm*—Ronald E. Greigg

(57) ABSTRACT

A piston is guided by a two-point guide thus allowing a working liquid to smoothly flow into or flow out from a liquid chamber. The liquid chamber is formed into a donut shape and an opening of a passage of the working liquid is arranged at a center portion of the donut. The piston adopts a stepped structure which has a large-diameter portion and a small-diameter portion. The large-diameter portion is fitted into a first cylinder bore and a small-diameter portion is fitted into a second cylinder bore. The working liquid flows into or flows out from the hydraulic chamber through groove passages formed on an outer periphery of the small-diameter portions.

9 Claims, 2 Drawing Sheets

HYDRAULIC FLUID RESERVOIR AND HYDRAULIC PRESSURE CONTROL UNIT

CROSS-REFERENCE TO RELATED APPLICATION

This application is a 35 USC 371 application of PCT/JP 2005/021740 filed on Nov. 26, 2005.

BACKGROUND OF THE INVENTION

1. Field of the Invention

The present invention relates to a piston-type hydraulic fluid reservoir (or working liquid reservoir) which can store a working liquid of a hydraulic circuit, and more particularly to a reservoir technique which forms a hydraulic chamber into a donut shape thus making the movement of a piston smoother.

2. Description of the Prior Art

A known vehicle-use brake hydraulic control circuit such as an anti-lock brake device includes a working liquid reservoir which temporarily stores a working liquid released from a wheel cylinder. Although a capacity of the working liquid reservoir is small, the working liquid flows into or flows out from working liquid reservoir each time a brake control is performed. The working liquid reservoir is, in general, of a piston type, wherein a piston defines a hydraulic chamber and a gas chamber in the inside of a cylinder bore. The movement of the piston is relatively frequent and hence, it is important to effectively guide the piston.

There has been known a technique which guides the piston at two points (that is, two portions). This two-point guide technique can surely perform the guiding compared to the general one-point guiding and also can shorten an axial length of the piston and hence, the two-point guide technique is effective in the miniaturization of the working liquid reservoir.

Japanese Utility Model Laid-open Publication Hei5 (1993)-65730 describes a technique in which a hydraulic chamber is defined by a piston head, a guide shaft having a small diameter is mounted on a side of the piston head which is positioned in a gas chamber which is positioned opposite to the hydraulic chamber, and the small-diameter guide shaft is made to penetrate a plug member (a member which closes the gas chamber). To focus an attention to the movement of the piston head, the movement of the piston head is guided at two portions, that is, by an outer peripheral portion of the large-sized piston head per se and an outer peripheral portion of the small-sized guide shaft which is integrally formed with the piston head.

The guiding of the piston side at two portions as described in patent document 1 is basically effective in guiding the piston smoothly. However, the hydraulic chamber defined by the piston maintains the same cylindrical type as in the case of one-point guide and hence, an opening of a passage through which a working liquid flows into or flows out from the cylindrical type hydraulic chamber is also deviated or offset with respect to the hydraulic chamber. Accordingly, the flow of the working liquid which enters or is discharged from the hydraulic chamber is disturbed and hence, there exists a possibility that a force which impedes the smooth movement of the piston is generated although an amount of the force may be considerably small.

SUMMARY OF THE INVENTION

Under the circumstance in which the miniaturization of the working liquid reservoir per se is in progress, to ensure the more rapid responsiveness in a brake control, as one of external factors which influences the motion of the piston, it is required to ensure the smooth inflow of the working liquid into the hydraulic chamber and the smooth outflow of the working liquid from the hydraulic chamber.

Accordingly, it is an object of the present invention to provide a novel type of a working liquid reservoir which ensures the smoother inflow of a working liquid into a hydraulic chamber and the smoother outflow of the working liquid from the hydraulic chamber on a premise that a piston is guided at two points.

In the present invention, a hydraulic chamber which stores a working liquid is formed into a donut shape, and an opening of a passage for the working liquid is arranged at a center portion of the donut. Due to such a constitution, the turbulence attributed to the flow of the working liquid (turbulence which impedes the smooth movement of a piston) can be minimized. Accordingly, the present invention has constitutional features in following points.

(A) A housing has a stepped cylinder bore including a first, large portion which defines the hydraulic chamber and a second smaller diameter portion coaxial with and extending from the first portion.

(B) The piston which is movably fitted into the cylinder bore has a stepped structure and includes a large-diameter portion which is fitted into the cylinder bore and a small-diameter portion which is fitted into the second cylinder bore and hence, the hydraulic chamber in the inside of the cylinder bore is formed into a donut shape.

(C) A communication passage is formed between an inner peripheral wall of the second cylinder bore and an outer periphery of the small-diameter portion of the piston, and the working liquid reciprocates between the donut-shaped hydraulic chamber and an external hydraulic circuit through the communication passage.

In the working liquid reservoir of the present invention, a two-point guide of the moving piston is constituted of a portions on the large-diameter portion and on the small-diameter portion, that is, the two-point guide of the moving piston is constituted of the small-diameter portion which is filled with the working liquid and the outer periphery of the large-diameter piston. The small-diameter portion is positioned in the center of the passage in which the working liquid flows and hence, the working liquid functions as a lubricant and makes a guiding function smooth thus preventing wear attributed to guiding. Further, two portions of the piston are guided by cylinder bores and hence, compared to a case in which a guiding function is obtained by making use of a separate member joined to a piston (see the above-mentioned Japanese patent document), the piston can be surely guided thus making the movement of the piston smoother.

In a preferred embodiment of the present invention, in the small-diameter portion of the piston which constitutes one guide, a plurality of groove passages which extends along the axial direction of the small-diameter portion may be formed. Here, a land portion between neighboring groove passages functions as a guide wall which guides the movement of the piston.

BRIEF DESCRIPTION OF THE DRAWINGS

The foregoing and other features of the invention will become apparent from the description contained below, taken in conjunction with the drawings, in which.

DESCRIPTION OF THE PREFERRED EMBODIMENTS

Figure 1:
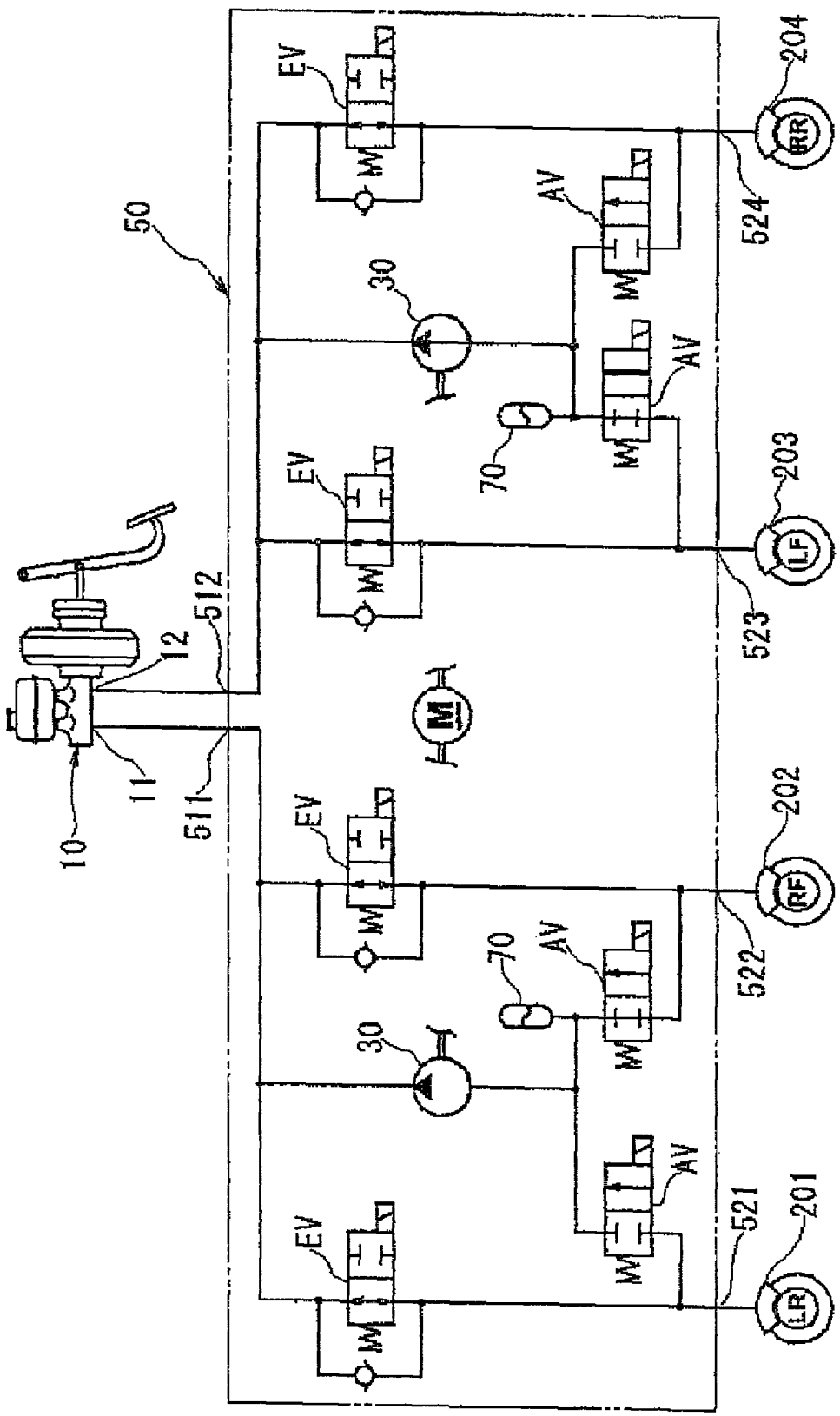
FIG. 1 is a circuit diagram showing one example of the vehicle-use brake control device including a working liquid reservoir of the present invention.

FIG. 1 is a circuit diagram showing one example of a vehicle-use brake control device including a working liquid reservoir of the present invention. The brake control device is a well-known circuit for an anti-lock control. The basic elements of the brake control device are constituted of a tandem-type master cylinder 10 which constitutes a liquid pressure generating source of a brake, four wheel cylinders 201, 202, 203, 204 which are provided corresponding to four wheels of a vehicle, and a hydraulic control unit 50 which is positioned between the wheel cylinders 201 to 204 and the master cylinder 10.

The tandem-type master cylinder 10 has two independent ports 11, 12, and two pipe connection ports 511, 512 are formed in a housing 550 of a hydraulic control unit 50 corresponding to two ports 11, 12. Further, the housing of the hydraulic control unit 50 includes four separate pipe connection ports 521, 522, 523, 524 corresponding to the four wheel cylinders 201 to 204.

Further, the hydraulic control unit 50 includes four normally-opened solenoid valves EV and four normally-closed solenoid valves AV corresponding to the four wheel cylinders 201 to 204. The hydraulic control unit 50 includes a pump 30 which is driven by an electric motor M. The pump 30 is constituted of coupled plunger pumps, and a brake liquid pressure is applied to the respective wheel cylinders 201 to 204 through the normally-opened respective solenoid valves EV, while a brake liquid pressure of the respective wheel cylinders 201 to 204 is released to the working liquid reservoir 70 through the normally-closed respective solenoid valves AV. It may be appreciated that along with the anti-lock control, the working liquid in the circuit flows into or flows out from the working liquid reservoir 70 in response to operations of the pump 30 and the respective solenoid valves EV, AV. Accordingly, to ensure the smooth and rapid brake control, it is necessary to perform the inflow and the outflow of the working liquid with respect to the working liquid reservoir 70.

Figure 2:
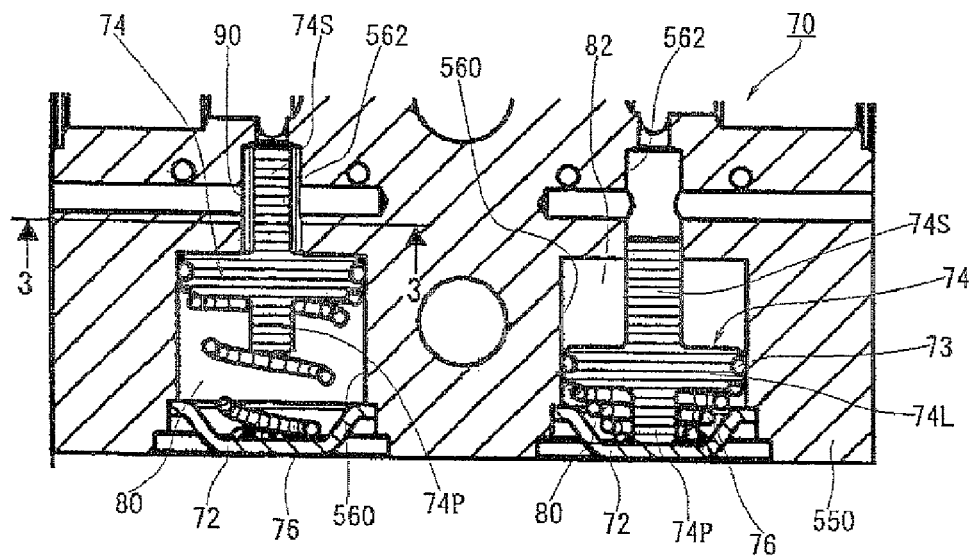
FIG. 2 is a cross-sectional view showing one embodiment of the working liquid reservoir of the present invention, wherein the drawing shows states in which the piston assumes different positions at left and right sides of the drawing.

The working liquid reservoir 70 is a piston-type reservoir with a capacity of approximately 3 cc. The working liquid reservoir 70 is housed in a block-like housing of the hydraulic control unit 50. FIG. 2 shows the cross-sectional structure of the working liquid reservoir 70. Here, in FIG. 2, a state in which the working liquid stored in the working liquid reservoir 70 is zero or almost zero is shown on a left side, while a state in which the working liquid reservoir 70 is filled with the stored working liquid is shown on a right side.

The housing 550 of the hydraulic control unit 50 is a molded product made of aluminum metal or aluminum-based alloy. The housing 550 includes a chamber which houses the respective solenoid valves EV, AV and the like therein and, respective pipe connection ports 511, 512, and 521 to 524 are formed in side surfaces of the chamber. The housing 550 defines a stepped cylinder bore 560, including a large diameter portion constituting the working liquid reservoir 70, together with a plurality of these chamber spaces.

The cylinder bore 560 is a stepped bore which opens in a downwardly directed surface of the housing 550 when the housing 550 is set. A first, small diameter portion 562 of the cylinder bore 560 from a depth of the bore to the vicinity of an opening portion has a uniform diameter, and a second, enlarged portion of the cylinder bore 560 defines the hydraulic chamber and terminates at its open end in a further enlarged counterbore receives a lid member 72 by press-fitting and caulking. The lid member 72 is made of metal and hermetically seals the cylinder bore 560 by fixing.

In the inside of the cylinder bore 560 which is hermetically sealed by the lid member 72, besides a resin-made piston 74, a conical compression spring 76 which pushes the piston 74 in the depth direction of the cylinder bore 560 is arranged. What must be noted here is that the piston 74 is configured to possess the stepped structure which provides a two-point guide. The piston 74 is integrally provided with a large-diameter portion 74L which is snugly fitted into and guided by the cylinder bore 560, a small-diameter portion 74S which extends in the axial direction from one surface of the large-diameter portion 74L, and a projecting portion 74P which is arranged on a side opposite to the small-diameter portion 74S. The small-diameter portion 74S and the projecting portion 74P are respectively positioned at the center on both sides of the large-diameter portion 74L and hence, three components consisting of the large-diameter portion 74L, the small-diameter portion 74S and the projecting portion 74P are coaxially aligned with each other. The projecting portion 74P is positioned inside the compression spring 76 and performs a function of stably supporting the compression spring 76 and performs a function as a stop for restricting a stroke of the piston 74. Here, in a full-stroke state shown on the right side of FIG. 2, the projecting portion 74P of the piston 74 is brought into contact with one surface of the lid member 72 thus restricting the further movement of the piston 74.

The large-diameter portion 74L of the piston 74 supports an O-ring 73 in a groove formed in an outer periphery thereof thus defining the inside of the cylinder bore 560 into a hydraulic chamber 82 and a gas chamber 80. A gas in the gas chamber 80 is usually air but an inert gas such as nitrogen or helium may be used. It is preferable that the gas chamber 80 constitutes a gas spring thus compensating for a spring force of the compression spring 76.

Here, due to the formation of the small-diameter portion 74S on the piston 74, the hydraulic chamber 82 is formed into a donut shape. Accordingly, the housing 550 has a cylinder bore portion 562 at a center of a bottom portion of the cylinder bore 560 which defines the hydraulic chamber 82. The cylinder bore portion 562 acts as a guide hole which receives the small-diameter portion 74S of the piston 74 and, further, functions to form a communication passage for allowing the hydraulic chamber 82 to communicate with the solenoid valve AV, the pump 30 or the like. By collectively arranging the communication passage to the small-diameter portion 74S of the piston 74, the working liquid reservoir can be designed while alleviating the restriction on the position and the size (diameter) of working liquid reservoir.

Figure 3:
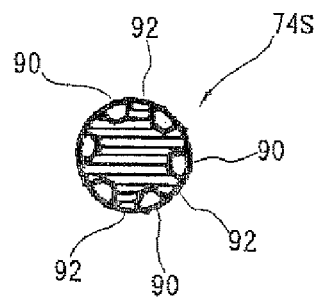
FIG. 3 is a cross-sectional view taken along a line 3-3 in FIG. 2.

FIG. 3 shows the cross-sectional structure of the small-diameter portion 74S. As can be understood from FIG. 3, the small-diameter portion 74S of the piston 74 has a plurality of (6 pieces in the example shown in the drawing) groove passages 90 extending along the axial direction, wherein these groove passages 90 are arranged at an equal interval in the circumferential direction and a land is formed between the neighboring groove passages 90. The land portions 92 between the groove passages 90 slide on an inner wall of the second cylinder bore 562 thus guiding the movement of the piston 74.

Accordingly, when the working liquid flows into or flows out from the hydraulic chamber 82, the piston 74 is guided by two portions on the respective outer peripheries of the large-diameter portion 74L and the small-diameter portion 74S and hence, the piston 74 is moved smoothly without becoming eccentric. Further, when the piston 74 moves, the working liquid flows into or flows out from the donut-shaped hydraulic chamber 82 through the groove passages 90 formed on the outer periphery of the small-diameter portion 74S and hence, there is no possibility that a force which disturbs the movement of the piston 74 (for example, an eccentric force) is generated attributed to the inflow and outflow of the working liquid. Further, the working liquid which flows into the groove passages 90 lubricates the outer periphery of the small-diameter portion 74S and hence, it is possible to obviate the wear as in the case of an operation in air.

Figure 4:
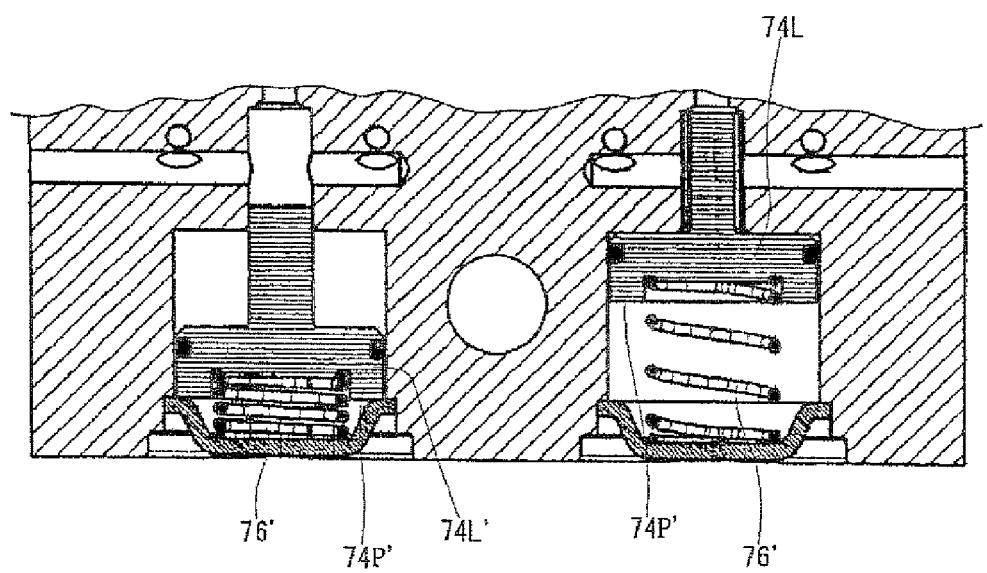
FIG. 4 is a cross-sectional view showing another embodiment of the present invention.

FIG. 4 is a cross-sectional view similar to the cross-sectional view in FIG. 3 and shows another embodiment of the working liquid reservoir. In the embodiment shown in FIG. 3, the projecting portion 74P which is arranged at the center is made to function as the stop and the conical spring which constitutes the compression spring 76 is arranged on the outer periphery of projecting portion 74S. In the embodiment shown in FIG. 4, however, a recessed portion is formed in one surface of a large-diameter portion 74L' of a piston 74, one end of a coil spring 76' which constitutes a compression spring is fitted into the recessed portion, and a ring-shaped projecting portion 74P' arranged outside the recessed portion is made to function as a stop.

The foregoing relates to a preferred exemplary embodiment of the invention, it being understood that other variants and embodiments thereof are possible within the spirit and scope of the invention, the latter being defined by the appended claims.

The invention claimed is:

1. In a working liquid reservoir for a hydraulic circuit comprising:
   a housing having a first cylinder bore;
   a piston which is movably fitted into the cylinder bore and dividing the inside of the cylinder bore into a hydraulic chamber and a gas chamber; and
   a compression spring positioned in the gas chamber and imparts a force to the piston which is directed toward the hydraulic chamber side from the gas chamber side, the working liquid reservoir being capable of storing a working liquid in the hydraulic circuit which is communicated with the inside of the hydraulic chamber,
   the improvement comprising
   (A) a second cylinder bore in the housing whose diameter is smaller than the diameter of the first cylinder bore, the second cylinder bore extending coaxially with the first cylinder bore which defines the hydraulic chamber and gas chamber,
   (B) the piston having a stepped structure including a large-diameter portion fitted into the first cylinder bore and a small-diameter portion which is fitted into the second cylinder bore whereby the hydraulic chamber in the inside of the cylinder bore is formed into a donut shape,
   wherein two portions of the piston consisting of the large-diameter portion and the small-diameter portion guide the movement of the piston, and
   wherein the small-diameter portion of the piston includes a plurality of groove passages along the axial direction of the small-diameter portion, and a land portion arranged between adjacent groove passages defining a guide wall for guiding the movement of the piston, and
   (C) a communication passage formed between an inner peripheral wall of the second cylinder bore and an outer periphery of the small-diameter portion of the piston, whereby a working liquid can reciprocate between the donut-shaped hydraulic chamber and the hydraulic circuit through the communication passage.

2. A working liquid reservoir according to claim 1, wherein the plurality of groove passages are arranged equidistantly around the small-diameter portion.

3. A working liquid reservoir according to claim 1, further comprising a projecting portion formed on the surface of the large-diameter portion of the piston which faces the gas chamber, the projecting portion restricting the stroke of the piston.

4. A working liquid reservoir according to claim 2, further comprising a projecting portion formed on the surface of the large-diameter portion of the piston which faces the gas chamber, the projecting portion restricting the stroke of the piston.

5. A working liquid reservoir according to claim 1, wherein the hydraulic circuit is a vehicle-use brake hydraulic control circuit which allows the working liquid to flow into and to flow out from the liquid chamber in response to a control of brake liquid pressure.

6. A working liquid reservoir according to claim 2, wherein the hydraulic circuit is a vehicle-use brake hydraulic control circuit which allows the working liquid to flow into and to flow out from the liquid chamber in response to a control of brake liquid pressure.

7. A working liquid reservoir according to claim 3, wherein the hydraulic circuit is a vehicle-use brake hydraulic control circuit which allows the working liquid to flow into and to flow out from the liquid chamber in response to a control of brake liquid pressure.

8. A working liquid reservoir according to claim 4, wherein the hydraulic circuit is a vehicle-use brake hydraulic control circuit which allows the working liquid to flow into and to flow out from the liquid chamber in response to a control of brake liquid pressure.

9. A hydraulic control unit including the working liquid reservoir defined in claim 1, further comprising the a hydraulic circuit communicated with the working liquid reservoir in the inside of a housing of the unit, and wherein
   the housing of the unit functions as a housing of the working liquid reservoir, and a communication passage which allows the working liquid reservoir and the hydraulic circuit to communicate with each other is collectively arranged at the small-diameter portion of the piston of the working liquid reservoir.

* * * * *